(12) United States Patent
Blasko

(10) Patent No.: US 8,975,842 B2
(45) Date of Patent: Mar. 10, 2015

(54) PERMANENT MAGNET MOTOR CONTROL

(71) Applicant: Hamilton Sundstrand Corporation, Charlotte, NC (US)

(72) Inventor: Vladimir Blasko, Avon, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 78 days.

(21) Appl. No.: 13/923,878

(22) Filed: Jun. 21, 2013

(65) Prior Publication Data
US 2014/0375233 A1    Dec. 25, 2014

(51) Int. Cl.
*H02P 21/00* (2006.01)
*H02P 21/06* (2006.01)

(52) U.S. Cl.
CPC .......... *H02P 21/06* (2013.01)
USPC ............ 318/400.02; 318/400.01; 318/700

(58) Field of Classification Search
CPC .............. H02P 21/06; H02P 21/0035
USPC ............... 318/400.02, 400.01, 700
See application file for complete search history.

(56) References Cited

U.S. PATENT DOCUMENTS 7,078,873 B2 *  7/2006  Suzuki et al. .......... 318/437

* cited by examiner

*Primary Examiner* — David S Luo
(74) *Attorney, Agent, or Firm* — Cantor Colburn LLP

(57) ABSTRACT

A three-phase permanent magnet motor is controlled by generating two-phase control signals. A rotation speed value is generated representing a rotation speed of the permanent magnet motor based on a q-current reference value and a q-current feedback value, the q-current reference value and the q-current feedback value corresponding to a q-phase winding. A d-phase voltage change value is generated based on a d-current reference value and a d-current feedback value, the d-current reference value and the d-current feedback value corresponding to the d-phase winding. A first d-phase voltage value is generated based on the rotation speed value, the d-phase voltage change value, the d-current reference value and the q-current reference value. A first q-phase voltage value is generated based on the rotation speed value, the q-current reference value and the d-current reference value.

16 Claims, 5 Drawing Sheets

PERMANENT MAGNET MOTOR CONTROL

BACKGROUND OF THE INVENTION

Embodiments of the invention relate electric motors and, in particular, to controlling permanent magnet electric motors.

Permanent magnet motors typically have three windings on a stator and a permanent magnet on a rotor. The stator windings are typically powered from a three-phase converter that creates a balanced set of three phase currents. This arrangement of three stator windings powered by the three-phase current system generates a rotating field with a rotation speed proportional to the number of pole pairs and the frequency of the stator current. In a typical permanent magnet motor, the rotation speed of the rotor is determined by a speed sensor or derived from the signal from a position sensor. A rotor position sensor gives information about position of rotor magnets with respect to stator windings. The position of the rotor magnets is important for properly energizing stator windings with current to control torque.

BRIEF DESCRIPTION OF THE INVENTION

Embodiments of the invention include a method of controlling a three-phase permanent magnet motor by generating two-phase control signals. The two phases are defined as a d-phase and a q-phase. The d-phase and q-phase have a d-phase winding and a q-phase winding, respectively, separated by ninety (90) degrees. The method includes generating a rotation speed value representing a rotation speed of the permanent magnet motor based on a q-current reference value and a q-current feedback value, the q-current reference value and the q-current feedback value corresponding to the q-phase winding. The method further includes generating a d-phase voltage change value based on a d-current reference value and a d-current feedback value, the d-current reference value and the d-current feedback value corresponding to the d-phase winding. The method includes generating a first d-phase voltage value based on the rotation speed value, the d-phase voltage change value, the d-current reference value and the q-current reference value. Finally, the method includes generating a first q-phase voltage value based on the rotation speed value, the q-current reference value and the d-current reference value.

Additional embodiments include a permanent magnet motor system which includes a permanent magnet motor having three windings corresponding to three phases and a motor control module configured to generate three winding current values to control current levels on the three windings of the permanent magnet motor to control a rotation of a rotor of the permanent magnet motor. The system includes a two-phase voltage control signal generator configured to generate a d-voltage control signal and a q-voltage control signal corresponding to a d-phase and a q-phase of the permanent magnet motor, the d-phase and q-phase representing a two-phase reference frame of the permanent magnet motor. The two-phase voltage control signal generator is configured to generate the d-voltage control signal and the q-voltage control signal based on a rotation speed value corresponding to a rotation speed of a rotor of the permanent magnet motor and based on a d-phase voltage change value, the two-phase voltage control signal generate configured to output the d-voltage control signal and the q-voltage control signal to the motor control module to generate the three winding current values.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Conventional permanent magnet motors use one or more sensors to detect a rotation speed of the rotor and rotor position. Embodiments of the invention relate to a permanent magnet motor. Embodiments of the invention relate to methods and systems for controlling a permanent magnet motor using two-phase control signals without measuring the rotation rate of the motor and without a rotor position device.

Figure 1:
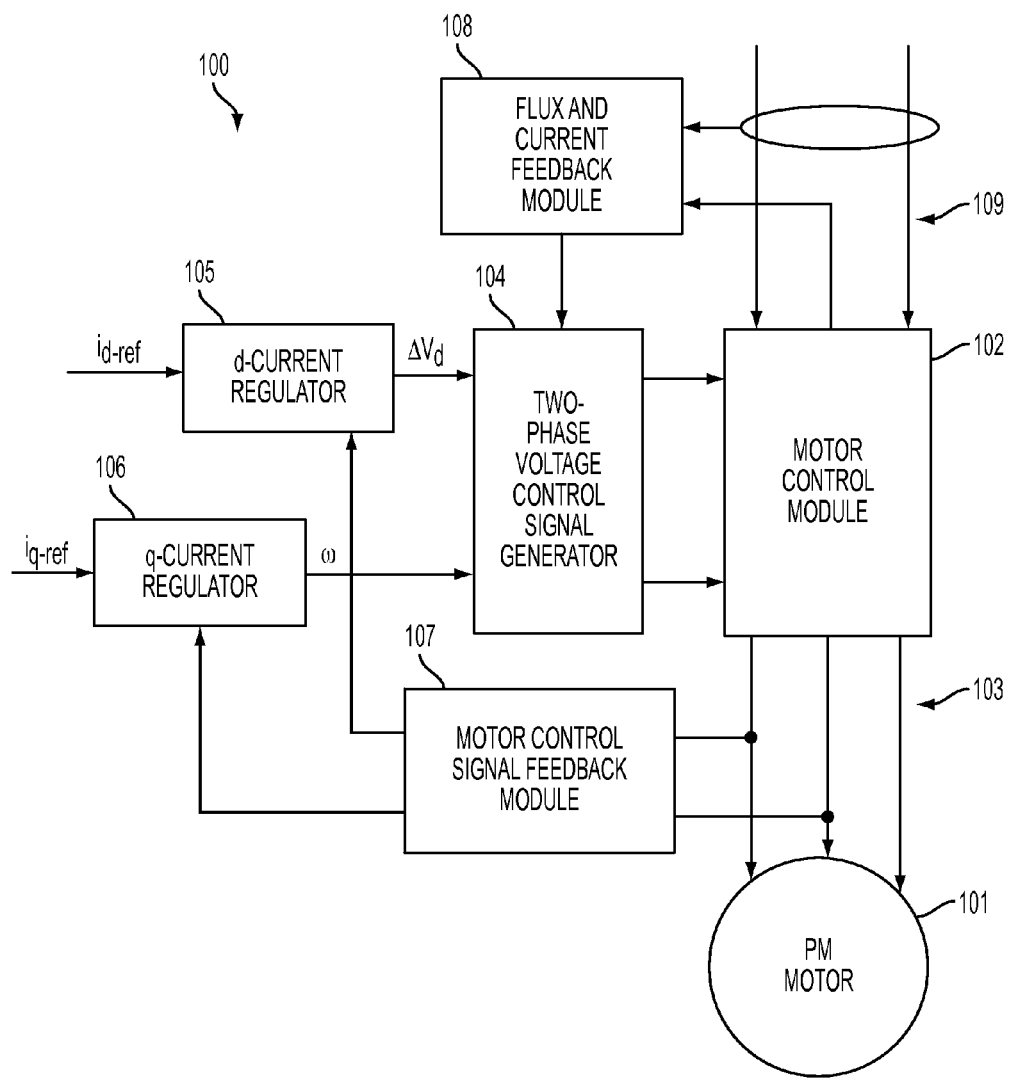
FIG. 1 illustrates a block diagram of a permanent magnet control system according to an embodiment of the invention.

FIG. 1 illustrates a block diagram of a permanent magnet motor control system 100 according to an embodiment of the invention. The system 100 includes a permanent magnet motor 101 and a motor control module 102 that supplies three-phase current signals 103 to the motor 101 to control rotation of a rotor with respect to a stator. In embodiments of the invention, the three-phase permanent magnet motor 101 is controlled based on two-phase voltage control signals $v_{dref}$ and $v_{qref}$ generated by a two-phase voltage control signal generator 104.

Figure 5:
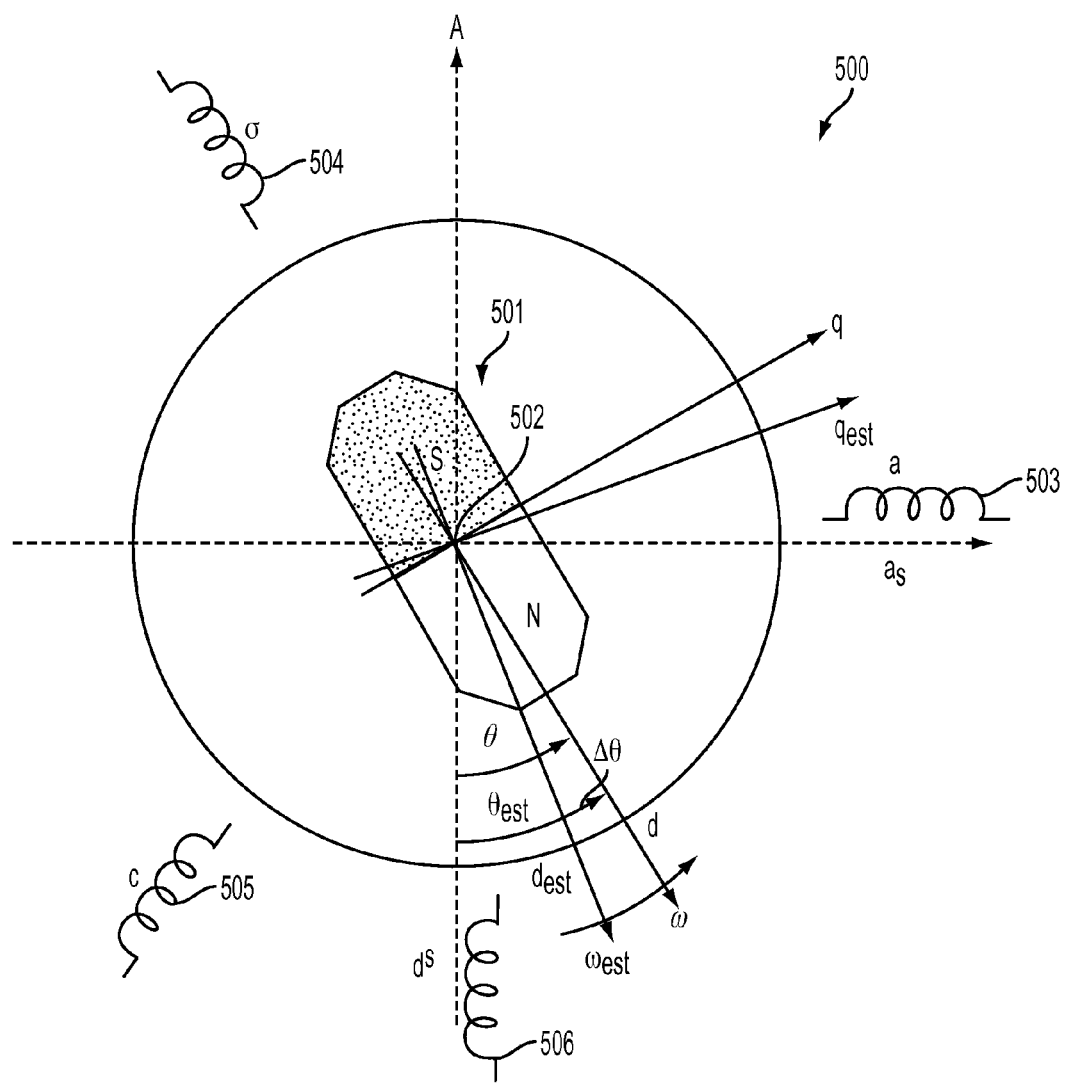
FIG. 5 illustrates annotations associated with a conventional permanent magnet motor.

FIG. 5 illustrates the relationship between the physical three-phases of the permanent magnet motor 101 and the conceptual two-phases that are used to generate the three-phase control signals. Referring to FIG. 5, the permanent magnet motor 500 includes a permanent magnet 501 that rotates around an axis 502. The permanent magnet 501 is surrounded by three coils 503, 504 and 505, typically wound around, or mounted to, a stator (not shown). The three coils 503, 504 and 505 are energized by currents corresponding to three phases a, b and c, respectively. The rate at which the coils 503, 504 and 505 are energized determines a rotation speed omega of the permanent magnet 501. The three coils 503, 504 and 505 are located one hundred twenty (120) degrees apart from each other and define a stationary, three-phase frame of reference.

In embodiments of the invention, control signals are generated based on a two-phase frame of reference. In FIG. 5, the two phases are identified as d-phase and q-phase, where d-phase lags q-phase by ninety (90) degrees. In a rotational frame of reference, a vector defining the d-phase extends along a longitudinal axis of the permanent magnet 501 and out from an "N" side of the permanent magnet. The permanent magnet 501 is illustrated as rotating in a counter-clockwise direction, and the vector defining the q-phase is ninety (90) degrees ahead of the vector defining the d-phase. From a stationary frame of reference, the coil 503 defines the q-axis ($q_s$) and the coil 506 defines the d axis ($d_s$) located at minus ninety (−90) degrees with respect to the q axis, where $q_s$ and $d_s$ indicate a stationary frame of reference.

Also illustrated in FIG. 5, ω represents an actual rotation speed of the permanent magnet 501, $ω_{est}$ represents an estimated, or calculated, rotation speed of the permanent magnet 501, θ represents an actual position of the magnet 501, relative to an axis A, $θ_{est}$ represents an estimated, or calculated, position of the magnet 501, d represents an actual d-phase vector in the rotational frame of reference, $d_{est}$ represents an estimated, or calculated, d-phase vector in the rotational frame of reference, q represents an actual q-phase vector in the rotational frame of reference, and $q_{est}$ represents an estimated, or calculated, q-phase vector in the rotational frame of reference.

A three-phase system may be transformed into a two-phase model based on mathematical algorithms implemented as logic and one or more processors executing instructions. An advantage of working with a two-phase system rather than a three-phase system is that a mutual inductance between the two orthogonal windings in a d-axis and q-axis is zero, which simplifies calculations. In addition, the number of voltage equations is reduced by a factor of ⅔. Also, when transformed into synchronous reference values, the values become DC quantities, which facilitates analysis and control with proportional-integral (PI) regulators.

Referring again to FIG. 1, the system 100 a d-current regulator 105 receives as inputs a d-current reference value $i_{d-ref}$ and a feedback signal from the motor control signal feedback module 107 and outputs a d-voltage difference signal $Δv_d$ to the two-phase voltage control signal generator 104. A q-current regulator 106 receives as inputs a q-current reference value $i_{q-ref}$ and a feedback signal from the motor control feedback module 107 and generates a rotation speed value ω. The q-current regulator 106 outputs the rotation speed value ω to the two-phase voltage control signal generator 104.

The system 100 further includes a flux and current feedback module 108 that receives as inputs data regarding a power level on a DC bus 109 and modulation signals from the motor control module 102 and outputs to the two-phase voltage control signal generator 104 an estimated flux value representing an estimated flux generated by the permanent magnet motor 101. The two-phase voltage control signal generator 104 generates the two-phase voltage control signals $v_{dref}$ and $v_{q-ref}$ based on the d-voltage difference signal $Δv_d$, the rotation speed value ω and the estimated flux value. According to embodiments of the invention, the rotation speed of a rotor of the permanent magnet motor 101 is calculated by the q-current regulator 106, and a separate detection mechanism, such as a sensor, counter, or other mechanism, is not needed to obtain the rotation speed value ω.

Figure 2:
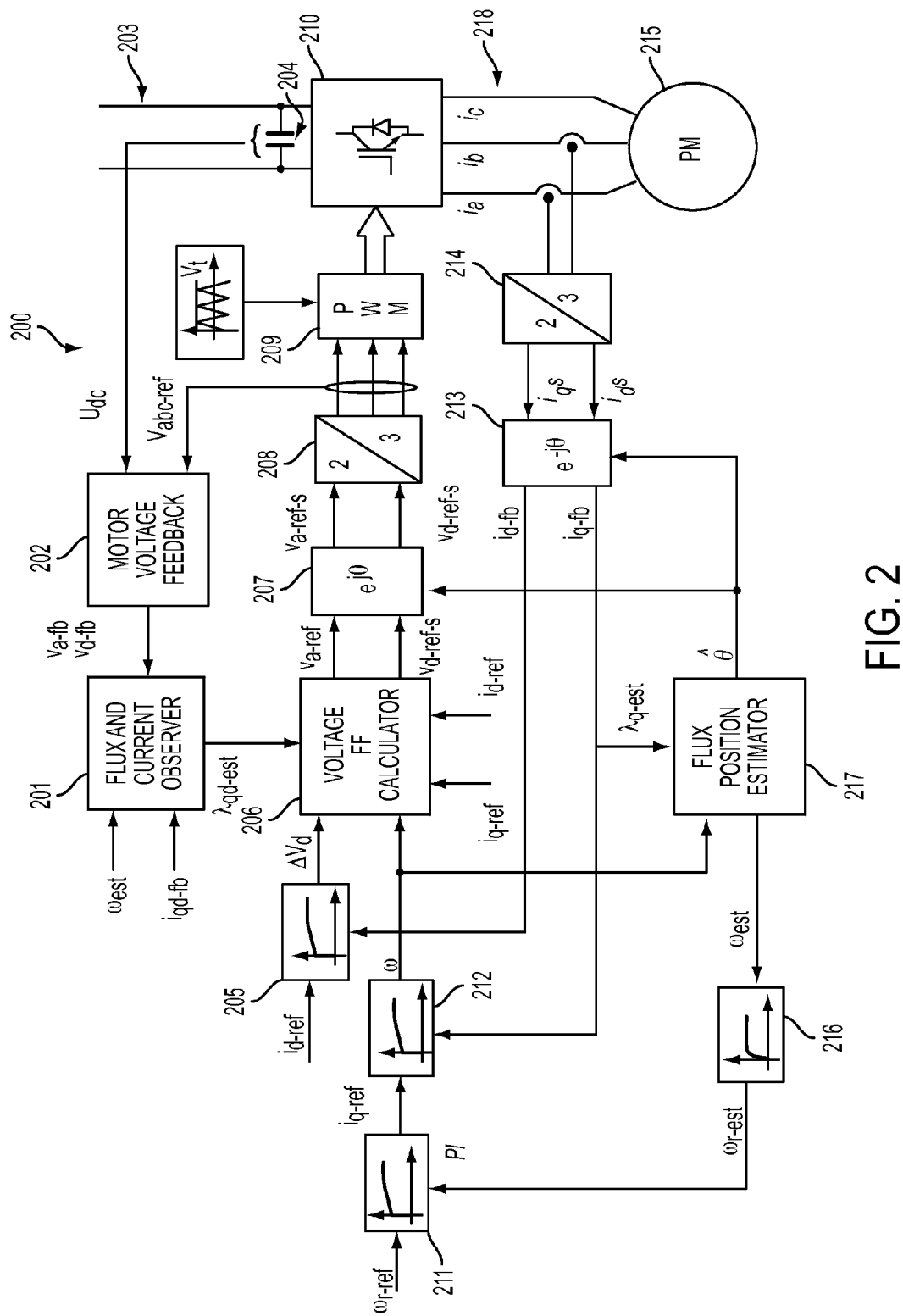
FIG. 2 illustrates a permanent magnet control system according to another embodiment of the invention.

FIG. 2 illustrates a system 200 for controlling a permanent magnet motor in additional detail. The system 200 includes a three-phase permanent magnet motor 215 and a three-gate-switch based power section (inverter) 210 for providing three phase motor voltages to control currents $i_a$, $i_b$ and $i_c$ to the three windings of the motor 215. In one embodiment, the power section 210 is an insulated-gate bipolar transistor (IGBT) bridge implemented by IGBT devices operating as switches. The switches in the power section 210 receive as inputs a direct voltage on a (DC) bus 203 and pulse-width modulated signals from a pulse-width modulator 209, and output to the motor 215 the three-phase voltage to control currents $i_a$, $i_b$ and $i_c$.

In embodiments of the invention, the three-phase motor 215 is driven by a two-phase model. Accordingly, the pulse-width modulator 209 receives as inputs modulation signals $v_{a-ref}$, $v_{b-ref}$ and $v_{c-ref}$ from a two-phase to three-phase converter 208, also referred to as a 2-to-3 converter 208. The 2-to-3 converter 208 receives as inputs stationary reference frame voltage signals $v_{d-ref-s}$ and $v_{q-ref-s}$, which are alternating current (AC) signals corresponding to the d-phase and the q-phase, respectively, of the two-phase model. The voltage signals $v_{d-ref-s}$ and $v_{q-ref-s}$ are generated by a rotator 207, which receives as inputs rotating reference frame voltage reference signals $v_{dref}$ and $v_{qref}$, as well as an estimated rotor position signal $θ_{est}$. The voltage reference signals $v_{dref}$ and $v_{qref}$ are output from a voltage feed forward calculator 206. The voltage feed forward calculator 206 may correspond to the two-phase voltage control signal generator 104, illustrated in FIG. 1. The voltage feed forward calculator 206 receives as inputs a d-phase voltage difference signal $Δv_d$, a rotation speed signal ω, a q-current reference signal $i_{q-ref}$, a d-current reference signal $i_{d-ref}$, an estimated q-phase flux value $λ_{q-est}$ and an estimated d-phase flux value $λ_{d-est}$ and motor winding parameters—resistance and inductance.

The d-phase voltage difference signal $Δv_d$ is generated by a d-current regulator 205. The d-current regulator receives as inputs the d-current reference signal $i_{d-ref}$ and a d-current feedback signal $i_{d-fb}$. The q-current regulator receives as inputs the q-current reference signal $i_{q-ref}$ and a q-current feedback signal $i_{q-fb}$. The q-current reference signal $i_{q-ref}$ is generated by a speed regulator 211, which receives as inputs a reference rotation speed signal $ω_{r-ref}$ corresponding to a rotational frame of reference, and a rotation speed feedback signal $ω_{r-est}$ corresponding to the rotational frame of reference. By referring to the "rotational frame of reference," it is understood that $ω_{r-ref}$ and $ω_{r-est}$ represent a rotation speed relative to a reference frame that rotates together with a rotor of the permanent magnet motor 215.

In one embodiment, one or more of the speed regulator 211, the q-current regulator 212 and the d-current regulator 205 is a proportional-integral (PI) controller. The rotation speed value ω that is input to the voltage feed forward calculator 206 is also provided to a flux position estimator 217. The flux position estimator 217 receives as inputs the rotation speed value ω and an estimated q-phase flux value $λ_{r-q}$. The flux position estimator 217 outputs a rotation speed feedback value $ω_{est}$ to the speed regulator 211 and a rotor position feedback value $θ_{est}$ to a rotator 213.

Figure 3:
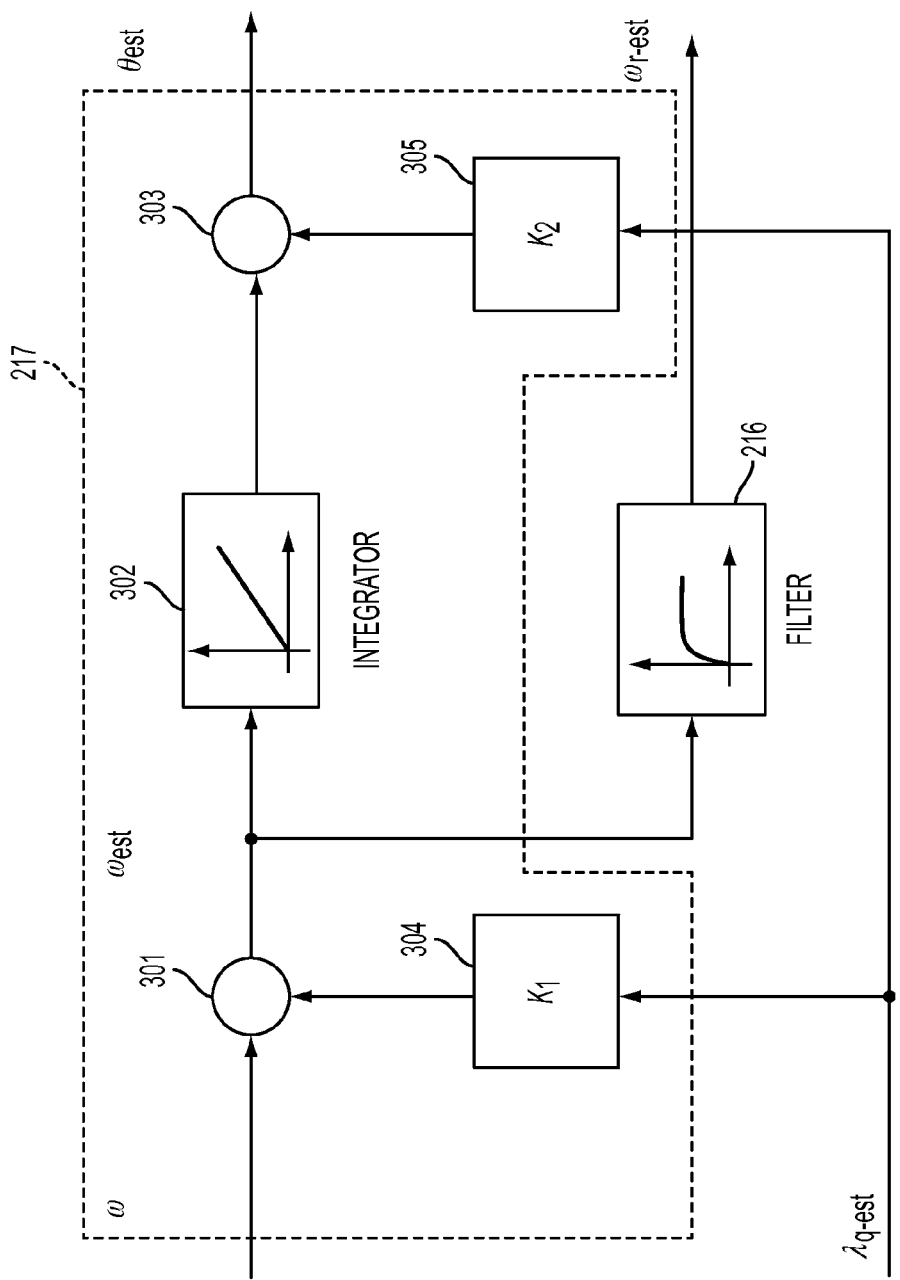
FIG. 3 illustrates a flux position estimator according to an embodiment of the invention.
Figure 4:
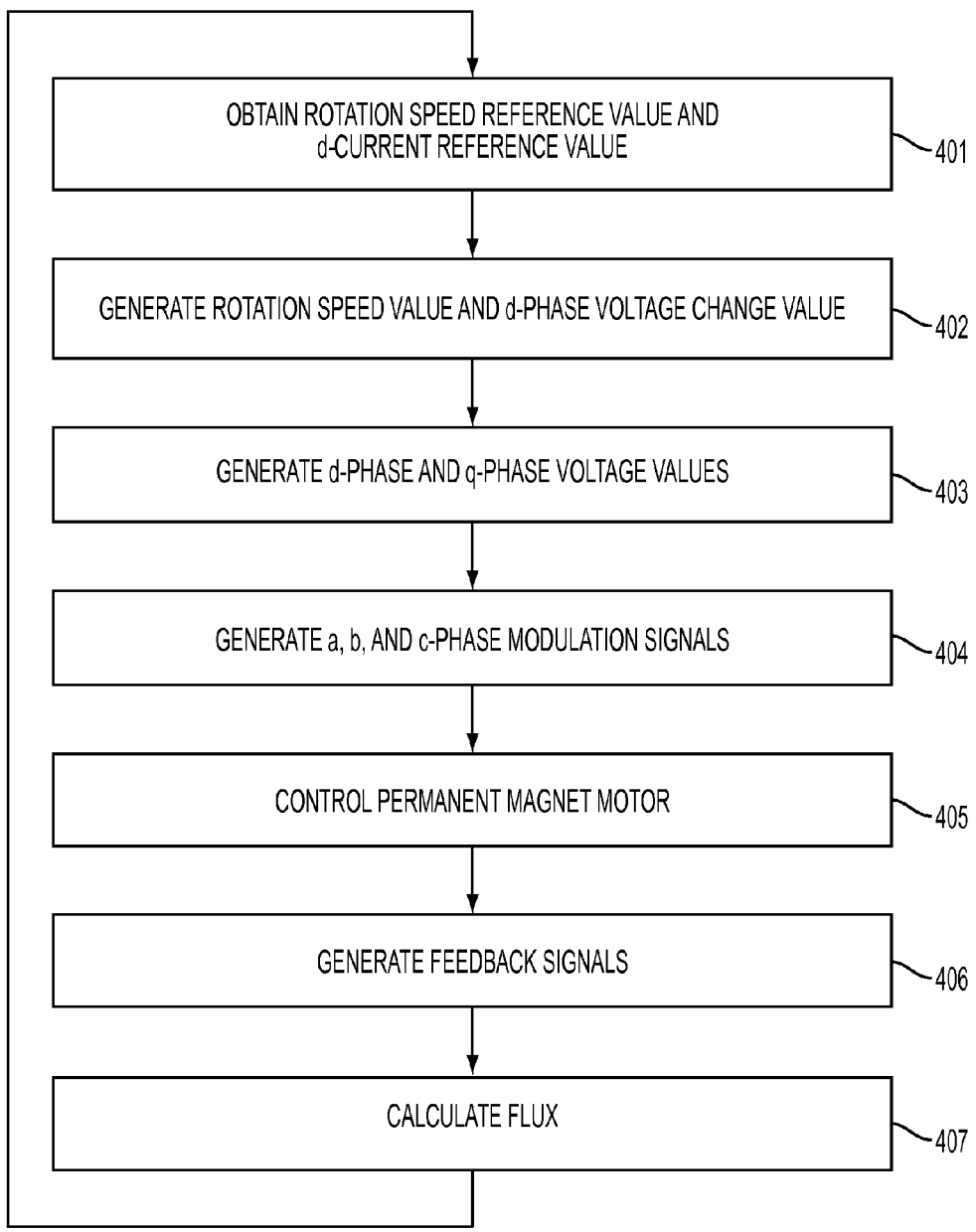
FIG. 4 illustrates a flow diagram of a method according to an embodiment of the invention.

The flux position estimator 217 is shown in additional detail in FIG. 3. The flux position estimator 217 modifies the rotation speed value ω generated by the q-current calculator 212 according to an estimated q-phase rotor flux $λ_{r-q}$. The q-phase rotor flux $λ_{r-q}$ may be proportional to an angle Δθ, or a difference between an estimated angle $θ_{est}$ and an actual angle θ. As illustrated in FIG. 3, the q-phase rotor flux $λ_{r-q}$ is input to an amplifier 304 to increase the value of the q-phase rotor flux $λ_{r-q}$ according to the gain K1. The resulting signal is combined with the rotation speed value ω output from the q-current regulator 212 by a summing circuit 301 to generate an estimated rotor speed value $ω_{est}$. In one embodiment, the q-phase rotor flux $λ_{r-q}$ and the rotation speed value ω are combined according to the following equation:

$$ω_{est} = ω + K1λ_{r-q} \quad (1)$$

An estimated angle of the rotor flux $θ_{est}$ is calculated by integrating the estimated speed with an integrator 302 and feeding forward the q-phase rotor flux $λ_{r-q}$ (represented by summing circuitry 303) multiplied by a gain K2 (block 305), according to the following equation:

$$θ_{est} = ∫ω_{est}dt + K2λ_{r-q}. \quad (2)$$

The rotor speed $ω_{r-est}$ is estimated by filtering the estimated speed $ω_{est}$ by a first order filter 216 with a time constant $τ_ω$, according to the following equation:

$$ω_{r-est} = (1/(1+sτ_ω))ω. \quad (3)$$

The voltage feed forward calculator 206 receives its rotor q-phase and d-phase flux values from a flux and current observer circuit 201. The flux and current observer circuit 201 receives as inputs the estimated rotor speed value $\omega_{est}$, the estimated q-current value $q_{est}$, the estimated d-current value $i_{d-est}$, and q-phase and d-phase motor feedback voltages $v_{d-fb}$ and $v_{q-fb}$. The q-phase and d-phase motor feedback voltages $v_{d-fb}$ and $v_{q-fb}$ are generated by a motor voltage feedback circuit 202, which generates the voltages $v_{d-fb}$ and $v_{q-fb}$ based on the modulation voltages $v_{a-ref}$, $v_{b-ref}$ and $v_{c-ref}$, and based on the DC bus voltage $u_{dc}$ of the DC bus 203, measured across the capacitor 204.

The d-current feedback signal $i_{d-fb}$ and the q-current feedback signal $i_{q-fb}$ are output from an rotator 213. The rotator receives as inputs the estimated angle of rotor flux $\theta_{est}$ from the flux position estimator 217, as well as the AC q-current value $i_{q-s}$ and AC d-current value $i_{d-s}$. The AC q-current and d-current values $i_{q-s}$ and $i_{d-s}$ are output from the 3-to-2 phase converter 214, which monitors the current lines 218 output from the three-gate switch 210 to the motor 215. In one embodiment, the 3-to-2 phase converter 214 monitors only two of the current lines 218, and calculates a current value of the third line based on the two monitored lines using an equation in which the sum off all three motor currents is zero. The 3-to-2 phase converter 214 converts the current signals $i_a$ and $i_b$ from a three-phase reference frame to a two-phase reference frame.

While interconnections of the system 200 have been described above, an operation of the system 200 is provided in more detail below. First, reference values are provided to the system 200 from an external source (not shown), such as a controller, processor or other system that calculates the reference rotation speed value $\omega_{r-ref}$ and d-current reference value $i_{dref}$. The reference rotation rate value $\omega_{r-ref}$ is provided to the speed regulator 211, along with the estimated rotation rate value $\omega_{r-est}$. The speed regulator 211 adjusts an output current, corresponding to the reference q-current value $i_{q-ref}$, until the estimated rotation speed $\omega_{r-est}$ equals the reference rotation speed $\omega_{r-ref}$.

The reference q-current $i_{q-ref}$ is provided to the q-current regulator 212, along with a q-current feedback value $i_{q-fb}$. The q-current regulator 212 may be a PI controller. The q-current regulator 212 adjusts the rotation speed value $\omega$ until the q-current feedback value $i_{q-fb}$ equals the q-current reference value $i_{q-ref}$. The q-current regulator 212 provides the rotation speed value $\omega$ to a voltage feed forward calculator 206.

A d-current reference value $i_{d-ref}$ and a d-current feedback value $i_{d-fb}$ are provided to a d-current regulator 205. The d-current regulator 205 adjusts an output signal corresponding to a d-phase voltage difference value $\Delta v_d$ until the d-current feedback value $i_{d-fb}$ equals the d-current reference value $i_{d-ref}$. The d-phase voltage difference value is output from the d-current regulator to the voltage feed forward calculator 206.

The voltage feed forward calculator 206 also receives as inputs the q-current reference value $i_{q-ref}$, the d-current reference value $i_{d-ref}$ and estimated d-phase and q-phase flux values $\lambda_{q-est}$ and $\lambda_{d-est}$. The flux and current observer 201 generates the estimated d-phase and q-phase flux values $\lambda_{q-est}$ and $\lambda_{d-est}$ based on the estimated rotation speed $\omega_{est}$, the d-current and q-current feedback values $i_{q-est}$ and $i_{d-est}$, and motor voltage feedback values $v_{q-est}$ and $v_{d-est}$. The motor voltage feedback values $v_{q-est}$ and $v_{d-est}$ are generated by a motor voltage feedback circuit 202, which calculates the motor voltage feedback values $v_{q-est}$ and $v_{d-est}$ based on a DC bus 203 voltage value $u_{dc}$ and modulation signal values $v_{a-ref}$, $v_{b-ref}$ and $v_{c-ref}$.

In one embodiment, a nonlinear state and parameter observer algorithm is implemented as follows:

$$\frac{d\hat{i}_q}{dt} = \frac{1}{L_q}(-\hat{i}_q R - \omega \hat{i}_d L_d - \omega \hat{\lambda}_{rd} + v_q) \text{ and}$$

$$\frac{d\hat{i}_d}{dt} = \frac{1}{L_d}(-\hat{i}_d R - \omega \hat{i}_q L_q - \omega \hat{\lambda}_{rq} + v_d),$$

where R is a stator winding resistance, Lq and Ld are inductances, $\lambda$ is a rotor magnet flux, and a heat symbol above variable, for example ($\hat{X}$) indicates estimated value of X and is equivalent to the notation $X_{est}$. However, in the above equations and the equations that follow, the abbreviated notation will be used for convenience.

Based on these equations, the closed loop observer algorithm for stator current and rotational components of back EMF can be formulated as follows:

$$\frac{d\hat{i}_q}{dt} = \frac{1}{L_q}[(-\hat{i}_q R_s - \omega \hat{i}_d L_d - \omega \hat{\lambda}_{rd} + v_q) + r_{11}(i_q - \hat{i}_q) + r_{12}(i_d - \hat{i}_d)]$$

$$\frac{d\hat{i}_d}{dt} = \frac{1}{L_d}[(-\hat{i}_d R_s - \omega \hat{i}_q L_q - \omega \hat{\lambda}_{rq} + v_d) + r_{21}(i_q - \hat{i}_q) + r_{22}(i_d - \hat{i}_d)]$$

$$\frac{d(\hat{\lambda}_{rq})}{dt} = [r_{31}(i_q - \hat{i}_q) + r_{32}(i_d - \hat{i}_d)]\text{sign}(\hat{\omega});$$

$$\frac{d(\hat{\lambda}_{rd})}{dt} = [r_{41}(i_q - \hat{i}_q) + r_{42}(i_d - \hat{i}_d)]\text{sign}(\hat{\omega})$$

The above equations may be re-written in standard matrix notation according to known methods to facilitate gain selection of the flux and current observer 201.

The voltage feed forward calculator 206 receives the d-phase voltage difference value $\Delta v_d$ from the d-current regulator 212, the rotation speed value $\omega$ from the q-current regulator 205, the q-current reference value $i_{q-ref}$ from the speed regulator 211, the d-current reference value $i_{d-ref}$, and the estimated q-phase and d-phase flux values $\lambda_{q-r-est}$ and $\lambda_{d-r-est}$ from the flux and current state observer 201 and generates a q-phase reference voltage signal $v_{q-ref}$ and d-phase reference voltage signal $v_{d-ref}$ based on the inputs. In one embodiment the voltage feed forward calculator 206 generates the q-phase reference voltage signal $v_{q-ref}$ and d-phase reference voltage signal $v_{d-ref}$ based on the following formulas:

$$v_{\hat{q}} = R i_{\hat{q}} + \hat{\omega}(L_d i_{\hat{d}} + \lambda_{r\hat{d}}) \text{ and}$$

$$v_{\hat{d}} = R i_{\hat{d}} - \hat{\omega}(L_q i_{\hat{q}} + \lambda_{r\hat{q}}) + \Delta v_d.$$

Since the q-phase reference voltage signal $v_{q-ref}$ and d-phase reference voltage signal $v_{d-ref}$ are DC values, they must be transformed to AC values and converted to a three-phase reference frame to drive the motor 215. Accordingly, the q-phase reference voltage signal $v_{q-ref}$ and d-phase reference voltage signal $v_{dref}$ are passed through a rotator 207, a 2-phase to 3-phase converter 208 and a pulse-width modulator 209 to generate the pulse-width modulated signals that drive the three-gate switch 210.

FIG. 5 is a flow diagram of a method according to an embodiment of the invention. In block 501, the reference signals are obtained. In particular, the rotation speed reference value $\omega_{r-ref}$ is obtained and the d-current reference value $i_{d-ref}$ is obtained. In block 502, the reference values are provided to regulators to generate a rotation speed value $\omega$ and d-phase voltage difference value. The regulators receive as inputs a reference value and a feedback value, and adjust the outputs until the feedback value matches the reference value. In particular, embodiments of the invention include a speed regulator, d-current regulator and q-current regulator. The q-current regulator receives as inputs a q-current reference value $i_{q\text{-}ref}$ and a q-current feedback value $i_{q\text{-}est}$ and outputs a rotation speed value ω.

In block 503, a d-phase voltage value and q-phase voltage value are generated based on the outputs of the regulators. In particular, a voltage feed forward calculator generates the d-phase voltage value and q-phase voltage value based on the outputs of the regulators and an estimated q-phase and d-phase flux value. In block 504, the d-phase and q-phase voltage values are converted to three-phase modulation signals, or a-phase, b-phase and c-phase modulation signals.

In block 505, the three-phase modulation signals are used to control a permanent magnet motor. For example, in one embodiment, the three-phase modulation signals may be provided to a pulse-width modulator, which may generate modulated signals to control a three-gate switch. The three-gate switch may be connected to a DC bus, and may generate three motor control signals, or three coil energizing signals, to energize the coils of the permanent magnet motor to drive the motor.

In block 506, feedback signals are generated based on the three motor control signals. In block 507, a flux of the permanent magnet is calculated based on the feedback signals. In one embodiment, a q-phase flux value and a d-phase flux value are calculated, and a q-phase flux position is estimated. The process is repeated at block 501, and the feedback values and estimated flux values are used to generate the rotation speed value, d-phase voltage change value, d-phase voltage value and q-phase voltage value.

In embodiments of the invention, a permanent magnet motor is controlled without the need to sense or detect a rotation speed or position of the permanent magnet motor. Instead, the rotation speed is provided as a value output from a q-current regulator and a rotor position angle is generated in as shown in block diagram in FIG. 3. In addition, a q-phase flux and d-phase flux of the permanent magnet motor are estimated and used to generate a q-phase reference voltage and d-phase reference voltage. In addition, a flux position of a rotor of the permanent magnet motor is estimated and used to calculate a rotation speed estimate value of a rotating frame of reference, and a rotor position value.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of controlling a three-phase permanent magnet motor by generating two-phase control signals, the two phases defined as a d-phase and a q-phase, the d-phase and q-phase having a d-phase winding and a q-phase winding, respectively, separated by ninety (90) degrees, comprising:
generating a rotation speed value representing a rotation speed of the permanent magnet motor based on a q-current reference value and a q-current feedback value, the q-current reference value and the q-current feedback value corresponding to the q-phase winding;
generating a d-phase voltage change value based on a d-current reference value and a d-current feedback value, the d-current reference value and the d-current feedback value corresponding to the d-phase winding;
generating a first d-phase voltage value based on the rotation speed value, the d-phase voltage change value, the d-current reference value and the q-current reference value; and
generating a first q-phase voltage value based on the rotation speed value, the q-current reference value and the d-current reference value.

2. The method of claim 1, wherein the first d-phase voltage value and the first q-phase voltage are generated based on a first flux value corresponding to an estimated magnetic flux generated by the permanent magnet motor.

3. The method of claim 2, wherein the first d-phase voltage value is calculated based on the following equation:

$$vd = Rid - \Omega(Lqiq + \lambda rq) + \Delta vd,$$

wherein R is a stator resistance of the permanent magnet motor, id is the reference d-current value, Lq is a q-phase inductance, iq is the reference q-current value, λrq is a q-phase flux value and Δvd is the d-phase voltage change value, and the first q-phase voltage value is calculated based on the following equation:

$$vq = Riq - \Omega(Ldid + \lambda rd),$$

wherein Ld is a d-phase inductance and λrd is a d-phase flux value.

4. The method of claim 1, wherein the first q-phase voltage value and the first d-phase voltage values are direct current (DC) signals, and the method further comprises:
generating a second q-phase voltage value based on the first q-phase voltage value, the second q-phase voltage value being an alternating current (AC) signal;
generating a second d-phase voltage value based on the first d-phase voltage value, the second d-phase voltage value being an AC signal;
generating a three-phase voltage output signal based on the second q-phase voltage value and the second d-phase voltage value; and
controlling a rotation of the permanent magnet motor based on the three-phase voltage output signal.

5. The method of claim 1, further comprising:
generating the q-current reference value based on a rotation speed reference value and a rotation speed flux-corrected value.

6. The method of claim 5, wherein the first d-phase voltage value and the first q-phase voltage value are generated based on a first flux value corresponding to a magnetic flux generated by the permanent magnet motor,
the first d-current feedback value is generated based on a measured a-current value corresponding to an a-phase of the three-phase permanent magnet motor having the a-phase, a b-phase and a c-phase,
the first q-current feedback value is generated based on a measured b-current value corresponding to the b-phase of the three-phase permanent magnet motor, the measured a-current value and the measured b-current value being supplied to a 3-to-2 phase converter to generate an AC q-current feedback signal and an AC d-current feedback signal, and the AC q-current feedback signal and the AC d-current feedback signal being supplied to an AC-to-DC conversion module to generate the d-current feedback value and the q-current feedback value.

7. The method of claim 6, wherein the d-current feedback value and the q-current feedback value are generated based on the AC d-current feedback signal, the AC q-current feedback signal and a rotor position correction signal generated based on a q-phase flux signal.

8. A permanent magnet motor system, comprising:
a permanent magnet motor having three windings corresponding to three phases;
a motor control module configured to generate three winding current values to control current levels on the three windings of the permanent magnet motor to control a rotation of a rotor of the permanent magnet motor; and
a two-phase voltage control signal generator configured to generate a d-voltage control signal and a q-voltage control signal corresponding to a d-phase and a q-phase of the permanent magnet motor, the d-phase and q-phase representing a two-phase reference frame of the permanent magnet motor, the two-phase voltage control signal generator configured to generate the d-voltage control signal and the q-voltage control signal based on a rotation speed value corresponding to a rotation speed of a rotor of the permanent magnet motor and based on a d-phase voltage change value, the two-phase voltage control signal generate configured to output the d-voltage control signal and the q-voltage control signal to the motor control module to generate the three winding current values.

9. The permanent magnet motor system of claim 8, wherein the two-phase voltage control signal generator is configured to generate the d-voltage control signal and the q-voltage control signal based on a first flux value corresponding to a magnetic flux generated by the permanent magnet motor.

10. The permanent magnet motor system of claim 8, further comprising:
a d-current regulator configured to generate the d-phase voltage change value based on a d-current reference value and a d-current feedback value, the d-current reference value and the d-current feedback value corresponding to the d-phase; and
a q-current regulator configured to generate the rotation speed value based on a q-current reference value and a q-current feedback value, the q-current reference value and q-current feedback value corresponding to the q-phase.

11. The permanent magnet motor system of claim 10, further comprising a speed regulator configured to generate the q-current reference value based on a rotation speed reference value and a rotation speed flux-corrected value.

12. The permanent magnet motor system of claim 11, further comprising:
a flux position estimation module configured to receive the rotation speed value and a q-phase flux value, configured to generate a rotor position adjustment value and a rotation speed flux-corrected value based on the rotation speed value and the q-phase flux value, configured to supply the rotor position adjustment value to the motor control module for generating the three winding current values, and configured to supply the rotation speed flux-corrected value to the speed regulator.

13. The permanent magnet motor of claim 10, further comprising:
a 3-to-2 converter to measure at least an a-current value of an a-phase of the permanent magnet motor and a b-current value of a b-phase of the permanent magnet motor, and to generate a q-current AC feedback signal and a d-current AC feedback signal based on the a-current value and the b-current value; and
a rotator configured to generate the d-current feedback signal and the d-current feedback signal based on the q-current AC feedback signal and the q-current AC feedback signal.

14. The permanent magnet motor system of claim 8, wherein the two-phase voltage control signal generator is configured to generate the d-voltage control signal based on the rotation speed value, the d-phase voltage change value, the d-current reference value and the q-current reference value, and
the two-phase voltage control signal generator is configured to generate the q-voltage control signal based on the rotation speed value, the q-current reference value and the d-current reference value.

15. The permanent magnet motor system of claim 8, wherein the two-phase voltage control signal generator is configured to generate the d-voltage control signal and the q-voltage control signal based on a first flux value corresponding to an estimated magnetic flux generated by the permanent magnet motor.

16. The permanent magnet motor system of claim 8, wherein the d-voltage control signal and the q-voltage control signal are direct current (DC) signals, and the motor control module comprising:
a DC-to-AC converter to convert the d-voltage control signal and the q-voltage control signal to an AC d-voltage control signal and an AC q-voltage control signal;
a 2-to-3 converter configured to generate three modulation signals based on the AC d-voltage control signal and the AC q-voltage control signal;
a pulse-width modulator configured to receive the three modulation signals and to output three modulated current control signals; and
a three-gate switching device configured to receive the three modulated current control signals and power from a DC power bus and to output to the permanent magnet motor three winding current signals to supply current to the three windings of the permanent magnet motor to drive the rotor of the permanent magnet motor.

* * * * *